(12) United States Patent
Cremin et al.

(10) Patent No.: US 9,106,531 B2
(45) Date of Patent: Aug. 11, 2015

(54) DETECTION OF LINK CONNECTIVITY IN COMMUNICATION SYSTEMS

(75) Inventors: Con David Cremin, Rochestown (IE); Anne Geraldine O'Connell, Rochestown (IE); Niall Finbarr Donovan, Carrigaline (IE)

(73) Assignee: Mingoa Limited, Mahon, Cork (IE)

( * ) Notice: Subject to any disclaimer, the term of this patent is extended or adjusted under 35 U.S.C. 154(b) by 146 days.

(21) Appl. No.: 13/638,679

(22) PCT Filed: Mar. 30, 2010

(86) PCT No.: PCT/IB2010/000941
§ 371 (c)(1),
(2), (4) Date: Oct. 1, 2012

(87) PCT Pub. No.: WO2011/121378
PCT Pub. Date: Oct. 6, 2011

(65) Prior Publication Data
US 2013/0024566 A1    Jan. 24, 2013

(51) Int. Cl.
*G06F 15/173* (2006.01)
*H04L 12/26* (2006.01)

(52) U.S. Cl.
CPC .................... *H04L 43/0811* (2013.01)

(58) Field of Classification Search
CPC ... H04L 43/0811; H04L 67/104; H04L 12/66; H04L 29/06319; H04L 3/50; H04L 63/104; H04L 67/1097; H04L 12/40136; H04L 41/0654; H04L 41/0816; H04L 41/082; H04L 43/0823; H04L 43/0829; H04L 43/0894; H04L 49/557; G06F 15/173; G06F 11/2025; G06F 11/0781; H04J 3/16; H04M 1/7253

USPC .......... 709/223–225, 227–229; 370/216, 218, 370/230, 241, 248, 389
See application file for complete search history.

(56) References Cited

U.S. PATENT DOCUMENTS 7,907,938 B2 * 3/2011 Brok .......................... 455/412.1
8,144,574 B1 * 3/2012 Hu et al. ....................... 370/218
(Continued)

FOREIGN PATENT DOCUMENTS

CN    101 369 922    2/2009
EP    1 416 671      5/2004
(Continued)

OTHER PUBLICATIONS

International Search Report for PCT/IB2010/000941 mailed Aug. 9, 2010.
(Continued)

*Primary Examiner* — Ryan Jakovac
*Assistant Examiner* — Da T Ton
(74) *Attorney, Agent, or Firm* — Simon Kahn

(57) ABSTRACT

A method of commencement of operation of a communication system such as an Ethernet OAM system enables an endpoint (A) to transmit and receive repetitive connectivity check messages on a link between the endpoint and a remote endpoint (B). A loss of connectivity with the remote endpoint is determined by the absence of received connectivity check messages within a monitoring interval. The commencement of the monitoring interval is delayed until a predetermined number of valid connectivity check messages has been received. The method may be implemented by use of a counter for received connectivity check messages and an additional waiting state in a state machine.

9 Claims, 6 Drawing Sheets

(56) References Cited

U.S. PATENT DOCUMENTS

| | | | | |
|---|---|---|---|---|
| 2005/0180419 | A1* | 8/2005 | Park et al. | 370/389 |
| 2007/0268817 | A1* | 11/2007 | Smallegange et al. | 370/216 |
| 2010/0082807 | A1 | 4/2010 | Wang | |
| 2010/0182913 | A1 | 7/2010 | Ding et al. | |

FOREIGN PATENT DOCUMENTS

| | | |
|---|---|---|
| GB | 2 464 127 | 4/2010 |
| WO | WO 2009/102278 | 8/2009 |

OTHER PUBLICATIONS

Written Opinion of the International Searching Authority mailed Aug. 9, 2010.

"IEEE Standard for Local and Metropolitan Area Networks—Virtual Bridged Local Area Networks Amendment 5: Connectivity Fault Management: IEEE Std 802.1ag-2007 (Amendment to IEEE Std 802.1Q-2005 as amended by IEEE Std 802.1ad-2005 and IEEE Std 802.1ak-2007)ED—Anonymous", IEEE Standard, Jan. 1, 2007, pp. 2-260.

* cited by examiner

DETECTION OF LINK CONNECTIVITY IN COMMUNICATION SYSTEMS

This application is the U.S. national phase of International Application No. PCT/IB2010/000941 filed 30 Mar. 2010 which designated the U.S. and claims priority to GB 0818206.5 filed 4 Oct. 2008, the entire contents of each of which are hereby incorporated by reference.

TECHNICAL FIELD

This application relates to the detection of link connectivity in communication systems, particularly Ethernet OAM circuits during start-up.

BACKGROUND

The standard specifications for operation of Ethernet OAM (Operation, Administration and Management) circuits, and particularly those conforming to IEEE 802.1ag and ITU-T Y.1731, include a check for connectivity between two management endpoints (MEPs) in a management domain (MD). The management endpoints perform the check by means of the periodic transmission of connectivity check messages (CCMs) to each other. Both endpoints determine whether they have received a valid CCM within a prescribed time. The period, i.e. the interval between CCM transmissions, can be, under current specifications, any one of eight values starting from 3.3 ms up to 10 minutes. The period may be configured, i.e. selected for each connection. A connectivity error is reported by an endpoint when a CCM has not been received from the endpoint's partner within a set multiple (presently 3.5) of the CCM transmission interval. Thus, at the fastest CCM rate (3.3 ms), an error will be reported when a message from the partner is not received within 3.5×3.3=11.55 ms.

During the start-up of a link, connectivity errors may be reported incorrectly owing to the time lag of an operator enabling both ends of a link. For example, suppose that an operator programs an endpoint A for an OAM connection at a rate of 3.3 ms. This endpoint will commence the transmission of CCMs and simultaneously checking for CCMs. If there is a delay of more than 11.55 ms in the commencement of operation and, in particular, the transmission of CCMs by the link partner B, endpoint A will report erroneously.

The present exemplary embodiment aims to reduce the incidence of such false reporting.

The state of the art is exemplified by the documents IEEE Std 802.1ag-2007 pages 138-158, US 2005/0180419-A1 and EP-1416671-A2.

BRIEF SUMMARY

The present exemplary embodiment is based on the establishment of continuity before a check for loss of connectivity is made, preferably employing an existing in-band data path to check for a good link before connectivity checking is enabled. The exemplary embodiment may be implemented in hardware, no special software intervention being required. In a practical implementation, the relevant state machine includes an additional state for the purpose of the present invention exemplar, embodiment.

In one aspect, the exemplary embodiment provides a method for commencement of operation of a communication system, including enabling an endpoint to transmit and receive repetitive connectivity check messages on a link between the endpoint and a remote endpoint; determining a loss of connectivity with the remote endpoint by the absence of received connectivity check messages within a monitoring interval; and delaying the commencement of the monitoring interval until a predetermined number of connectivity check messages has been received.

The method preferably includes operating a state machine which includes: a first state on entry into which the machine starts a monitoring interval; a second state on entry into which the machine starts a monitoring interval; a third state which the machine enters in the event of absence of reception of a connectivity check message within a current monitoring interval; wherein the machine enters the second state from the first on detection of a connectivity check message within a current monitoring interval while the machine is in said first state; and the machine re-enters the second state on detection of a connectivity check message within a current monitoring interval while the machine is in said second state; and the machine provides an indication of connectivity error on entry into said third state; wherein the machine has a additional state which controls entry of the machine into said first state and during which the machine counts valid received connectivity check messages, and on the reception of a predetermined number of said connectivity check messages, the machine enters said first state from said additional state.

The invention extends to the state machine as such and to a terminal including such a state machine.

DETAILED DESCRIPTION OF EXEMPLARY EMBODIMENTS

Figure 1:
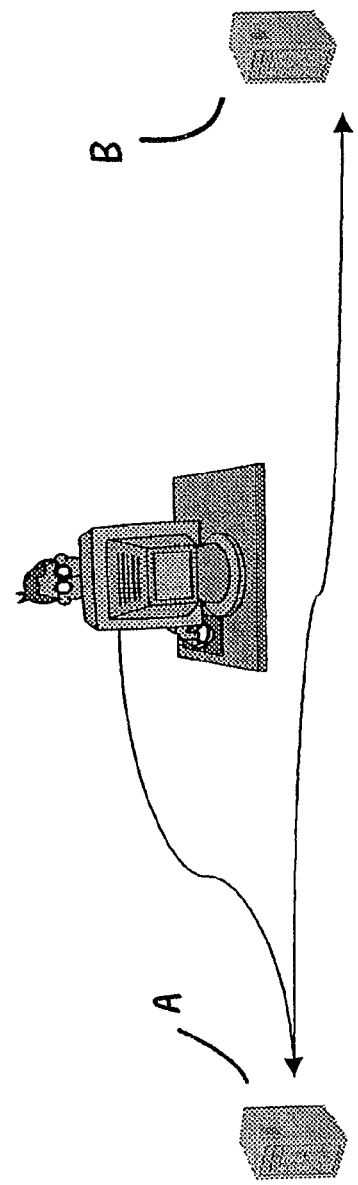
FIG. 1 is an explanatory diagram.

FIG. 1 illustrates a simple system in which OAM start-up is employed to establish a link between two peers A and B. The operator programs endpoint A for an OAM connection at a rate of 3.3 ms. According to the current specifications the endpoint A will immediately transmit CCMs and checking for CCMs at the programmed rate.

Figure 2:
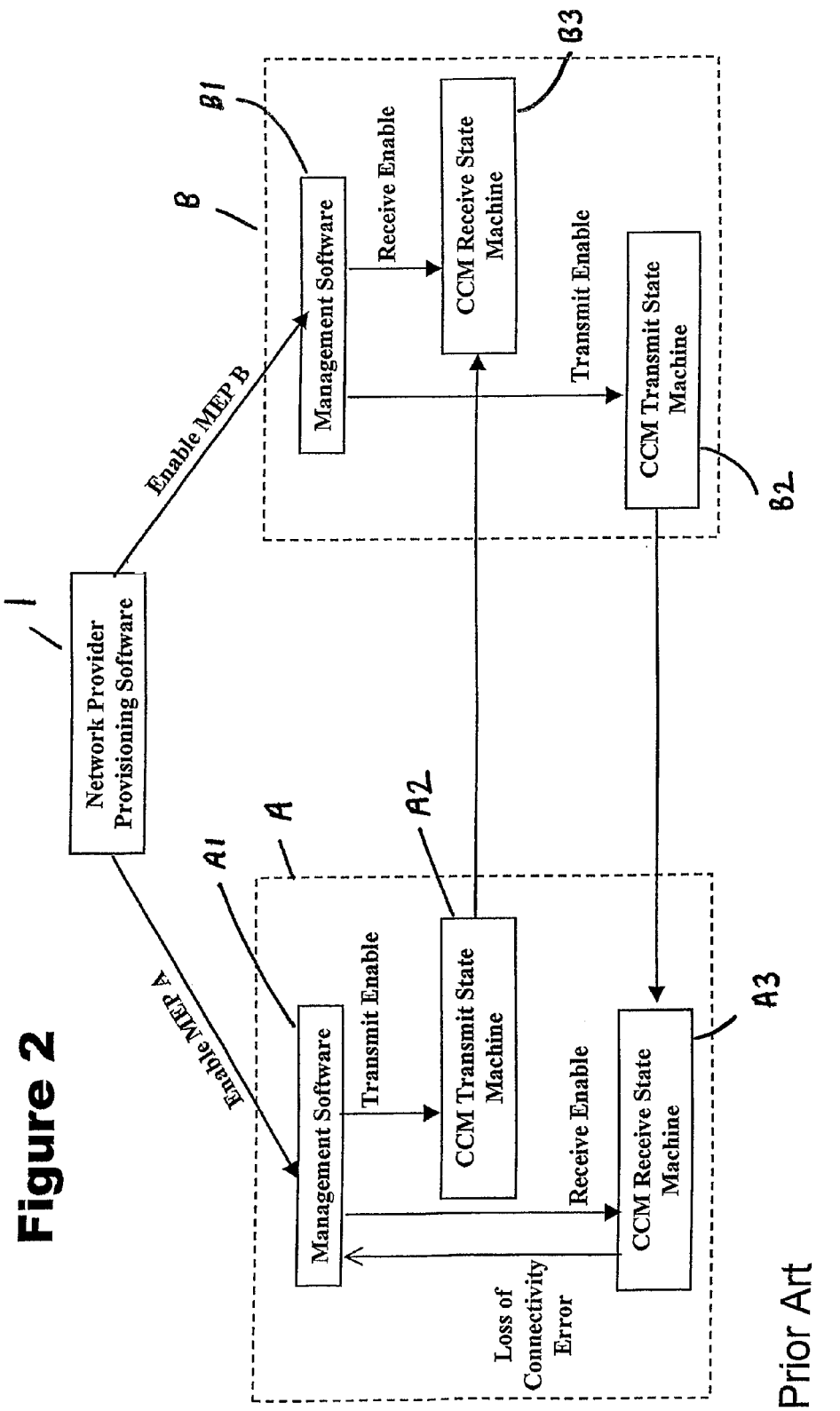
FIG. 2 is a diagram illustrating a known method of start-up of management endpoints.

FIG. 2 illustrates the known start-up in more detail. An endpoint A is shown by the chain-lines at the left, an endpoint B by the chain-lines at the right and the 'operator' by the network provider (provisioning software) 1 at top center.

Endpoint A is enabled by an appropriate message from the network provider 1. Its management software A1 immediately enables a CCM transmit state machine A2 and a CCM receive state machine A3. The CCMs from the CCM transmit state machine A2 travel on the data channel to the CCM receive state machine B3 in endpoint B and the CCM state machine A3 is enabled to receive CCMs from the CCM state machine B2 in endpoint B.

Some time later, for example, after an interval greater than 11.55 ms, the network provider 1 enables endpoint B and, in particular, the CCM receive and transmit state machines B3 and B2 in endpoint B. However, meanwhile the receive state machine A3 in endpoint A has already reported loss of connectivity since the maximum delay prescribed by the standard has been exceeded.

Figure 3:
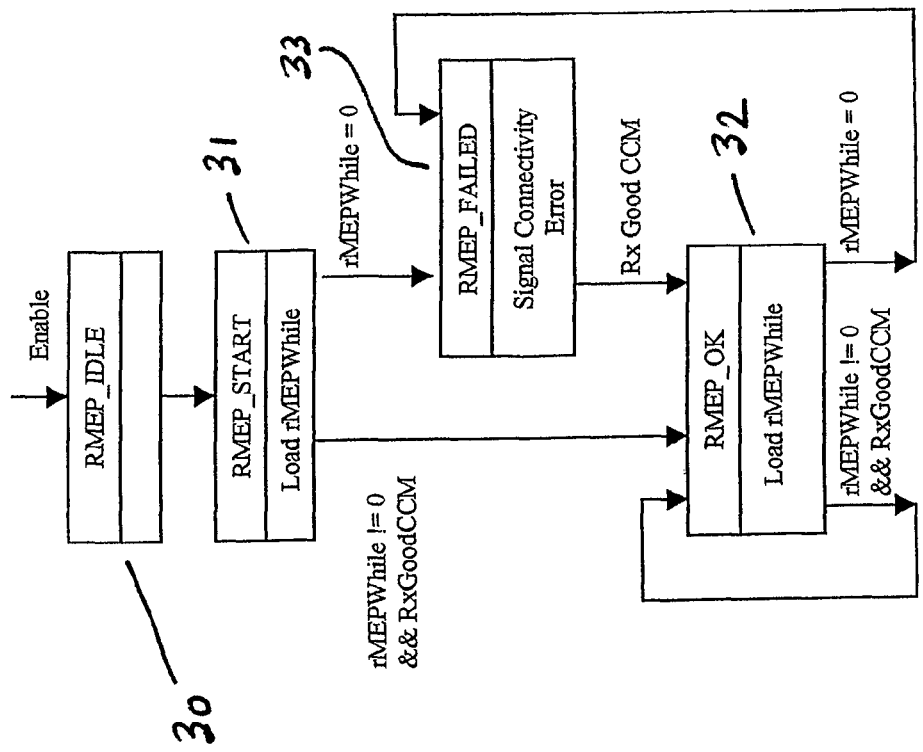
FIG. 3 is a diagram of a known state machine.

FIG. 3 illustrates a receive state machine as defined by IEEE 802.1ag and ITU Y.1731.

When the state machine is enabled it enters the IDLE state 30. This is formally denoted as the 'RMEP_IDLE' state; for simplicity herein, the prefix RMEP (Remote Management End Point) will be omitted. The machine then immediately enters the START state 31 (hereinafter called the 'first' state). In the START state a timer is started. This timer counts for the defined multiple (presently 3.5 times) of the selected CCM interval for the connection. If a valid CCM message is received within the timer's period, the state machine enters the OK state 32 (hereinafter called the 'second' state). The timer is re-loaded and the state machine again waits for the reception of a valid CCM during the new period.

If a valid CCM is not received before the timer times out while the state machine is in either the START state or the OK state, the state machine enters the FAILED state 33 (hereinafter called the 'third' state) and raises an alarm. It remains in that state until receives a valid CCM is received.

There is a high probability, especially when the CCM interval is selected to be at the shortest permitted value, than a signal connectivity error will be reported while the endpoint B is being initialized, i.e. before it is properly enabled.

Although a large value for rMEPWhile could be used, there is no certainty that the peer on the respective link will be fully enabled by the end of the prescribed interval. Another similar scheme would be to delay starting the receiver state machine for a given time. However, there is still no guarantee that the peer is transmitting its CCMs after the delay; and the present exemplary embodiment may be employed with advantage even when there is a substantial delay between the enabling of an endpoint and its entry into a state in which it can monitor received CCMs.

It might be feasible to send any received CCMs to the associated processor which on the reception of a selected number of CCMs would reconfigure the hardware to process the CCMs. However, such an expedient may consume substantial processing bandwidth and does not allow easy upgrading of existing OAM functionality, especially for the fastest rates.

Figure 4:
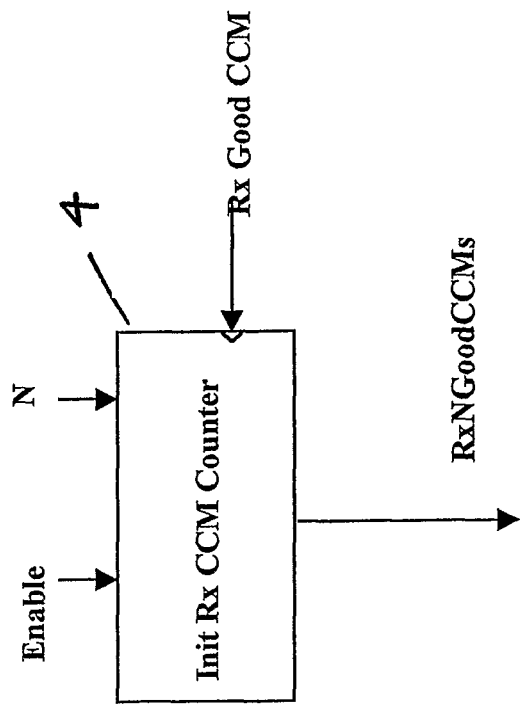
FIG. 4 is a diagram of a counter for use in the exemplary embodiment.
Figure 5:
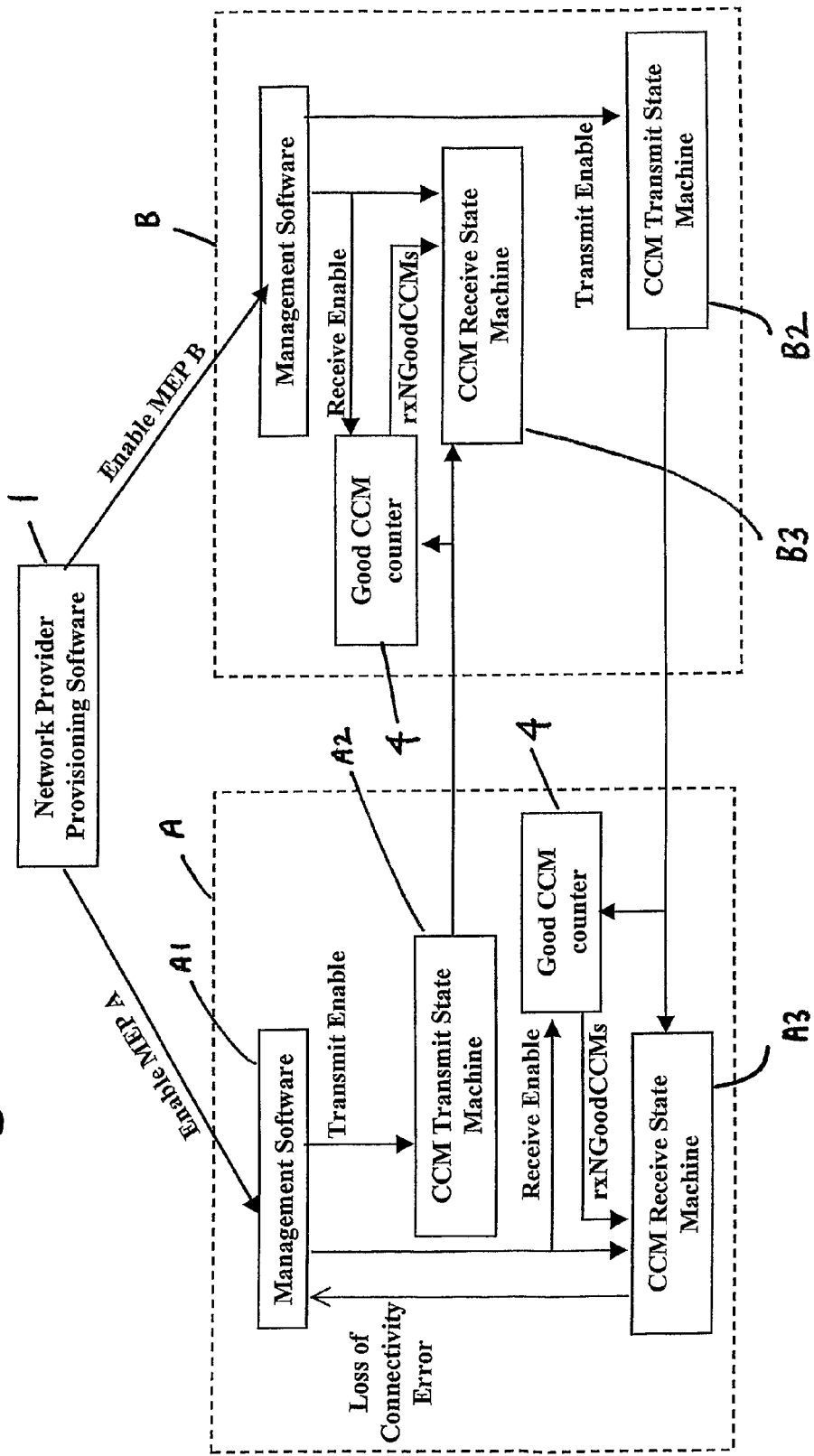
FIG. 5 is a diagram illustrating a method according to the exemplary embodiment.
Figure 6:
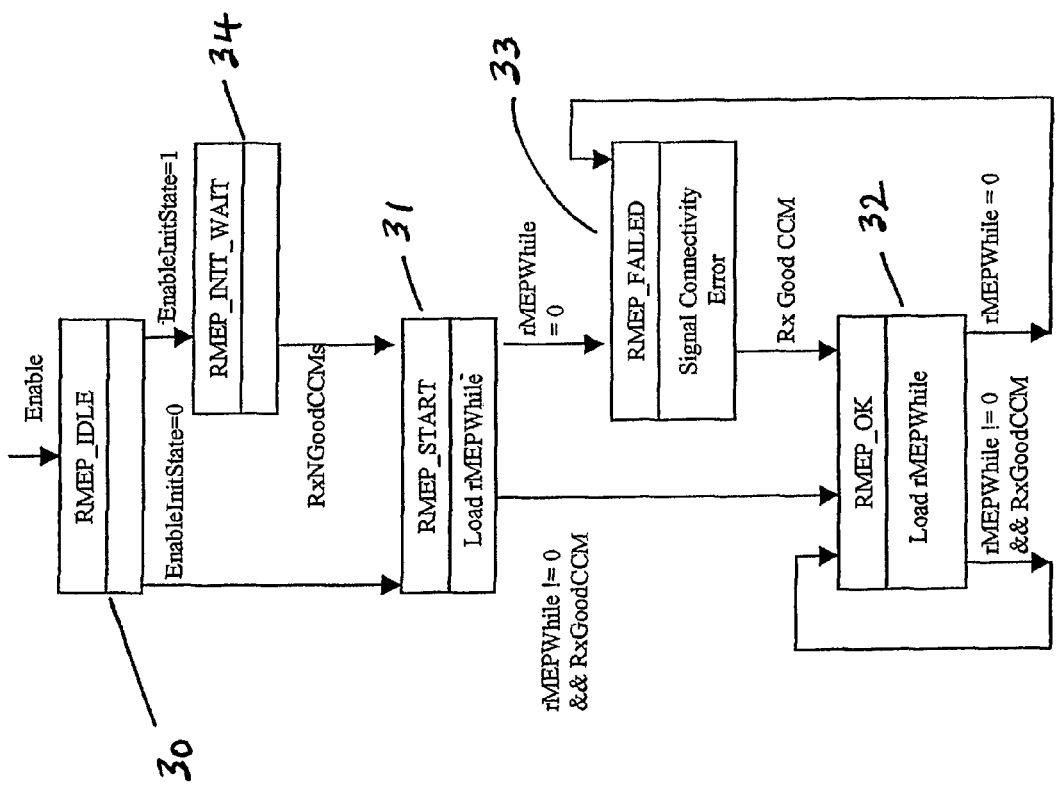
FIG. 6 is a diagram of a state machine according to the exemplary embodiment.

FIGS. 4, 5 and 6 illustrate one manner in which the exemplary embodiment may be put into practice.

FIG. 4 illustrates a counter 4 which when enabled loads a number N (which is adjustably selectable). The counter is decremented on each assertion of a valid received CCM (Rx-GoodCCM). Such a signal is necessary anyway to support the standard state machines and does not require any additional logic. If the counter counts N such signals, it provides an indication that N valid CCMs have been received.

FIG. 5 shows the incorporation of a counter 4 of valid received CCMs in each of the endpoints A and B in a system as already described with reference to FIG. 2. In each instance the counter is enabled by the respective management software. It receives CCMs from the link between the remote transmit state machine and the local receive state machine and it provides the indication 'RxNGoodCCMs' to the local receive state machine.

FIG. 6 illustrates the modification of the standard state machine. The receive state machine shown in FIG. 6 resembles that shown in FIG. 3, but includes an additional WAITING state 34 (RMEP_INIT_WAIT). Now the machine does not transition from the IDLE state 30 to the START state 31. Instead, it enters the INIT-WAIT state 34 and remains there until the assertion of the indication that N valid CCMs have been received. Then the machine enters the START state 31 and the operation then proceeds as described with reference to FIGS. 2 and 3.

In a system according to the exemplary embodiment, endpoint A is enabled as before, and will start transmitting CCMs. However, the OAM processing in endpoint A will wait for the reception of the selected number of valid CCMs before it starts to check for loss of connectivity. At some time later, endpoint B is enabled, but again it will wait for the reception of N valid CCMs before it commences a check for the loss of connectivity.

Ethernet OAM is customarily organized to work across more than two endpoints and can be scaled for a multipoint connection where a check for each peer endpoint is made and the present exemplary embodiment can be similarly organized.

The invention claimed is:

1. A method of commencement of operation of a communication system comprising:
    enabling an endpoint (A) to transmit and receive repetitive connectivity check messages on a link between the endpoint (A) and a remote endpoint (B); and
    receiving at endpoint (A) a predetermined number of the connectivity check messages from remote endpoint (B), and responsive to said received predetermined number of the connectivity check messages, asserting an indication of receipt;
    only after said assertion of indication of receipt, determining a loss of connectivity with the remote endpoint (B) by the absence of any of the connectivity check messages received at endpoint (A) from remote endpoint (B) within a first monitoring interval.

2. The method of claim 1 in which the communication system is an Ethernet Operation, Administration and Management system.

3. The method of claim 1, further comprising operating a state machine at endpoint (A), which state machine comprises:
    a first state on entry into which the machine starts the first monitoring interval;
    a second state on entry into which the machine starts a second monitoring interval;
    a third state which the state machine enters from the first state in the event of absence of reception any of the connectivity check messages from the remote endpoint (B) within the first monitoring interval, or enters from the second state in the event of absence of reception of any of the connectivity check messages from the remote endpoint (B) within the second monitoring interval; and
    a fourth state which controls entry of the state machine into the first state and durin which the state machine counts the connectivity check messages received from the remote endpoint (B), and on the count of the predetermined number of the connectivity check messages received from the remote endpoint (B) the state machine enters the first state from the fourth state and asserts said indication of receipt,
    wherein
    the state machine enters the second state from the first state on detection of any of the connectivity check messages received from remote endpoint (B) within the first monitoring interval while the state machine is in said first state;
    the state machine re-enters the second state on detection of any of the connectivity check messages received from remote endpoint (B) within the second monitoring interval while the state machine is in said second state; and
    the state machine provides an indication of connectivity error on entry into said third state.

4. A communication system management endpoint (MEP) circuit configured to establish a state machine for the monitoring of connectivity between a first endpoint and a second endpoint in a communication system which employs repetitive connectivity check messages, the MEP circuit state machine of the first endpoint comprising:

a wait state:
a start state;
an OK state; and
a failed state,
wherein:
upon startup the MEP circuit state machine of the first endpoint enters the wait state, and during the wait state the MEP circuit state machine of the first endpoint counts connectivity check messages received from the second endpoint, and on the count of a predetermined number of the connectivity check messages received from the second endpoint enters the start state;
in the start state the MEP circuit state machine of the first endpoint starts a first monitoring interval and in the event of absence of reception of any of the connectivity check messages from the second endpoint within the first monitoring interval enters the failed state, and in the event of detection of any of the connectivity check message received from the second endpoint within the first monitoring interval enters the OK state;
in the OK state the MEP circuit state machine of the first endpoint starts a second monitoring interval and in the event of absence of reception of any of the connectivity check messages from the second endpoint within the second monitoring interval enters the failed state, and in the event of detection of any of the connectivity check message received from the second endpoint within the second monitoring interval re-enters the OK state; and
in the failed state the MEP circuit state machine of the first endpoint provides an indication of connectivity error.

5. The communication system MEP circuit according to claim 4 in which the connectivity check messages of the MEP circuit state machine conform to standards relating to Ethernet Operation, Administration and Management systems.

6. The communication system MEP circuit according to claim 5 in which the standards include IEEE802.1ag and ITU Y.1731.

7. A data terminal comprising a management endpoint (MEP) circuit state machine for the monitoring of connectivity between itself and a second endpoint, in a communication system which employs repetitive connectivity check messages, the MEP circuit state machine comprising:

a wait state;
a start state;
an OK state; and
a failed state,
wherein:
upon startup the MEP circuit state machine enters the wait state, and during the wait state the MEP circuit state machine counts connectivity check messages received from the second endpoint, and on the count of a predetermined number of the connectivity check messages received from the second endpoint enters the start state;
in the start state the MEP circuit state machine starts a first monitoring interval and in the event of absence of reception of any of the connectivity check messages from the second endpoint within the first monitoring interval enters the failed state, and in the event of detection of any of the connectivity check message received from the second endpoint within the first monitoring interval enters the OK state;
in the OK state the MEP circuit state machine starts a second monitoring interval and in the event of absence of reception of any of the connectivity check messages from the second endpoint within the second monitoring interval enters the failed state, and in the event of detection of any of the connectivity check message received from the second endpoint within the second monitoring interval re-enters the OK state; and
in the failed state the MEP circuit state machine provides an indication of connectivity error.

8. The communication system MEP circuit according to claim 4, wherein the first monitoring interval and the second monitoring interval are the same.

9. The method of claim 3, wherein the first monitoring interval and the second monitoring interval are the same.

* * * * *